United States Patent
Chin et al.

(10) Patent No.: US 10,043,152 B1
(45) Date of Patent: Aug. 7, 2018

(54) FACILITATION OF LOST ITEM RETURN AND ITEM INVENTORY

(71) Applicant: Amazon Technologies, Inc., Reno, NV (US)

(72) Inventors: Ruth Landon Chin, Seattle, WA (US); Harsha Ramalingam, Kirkland, WA (US); Bhavnish H. Lathia, Redmond, WA (US); Austin E. Wilson, Sammamish, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 359 days.

(21) Appl. No.: 13/911,800

(22) Filed: Jun. 6, 2013

(51) Int. Cl.
*G06Q 10/08* (2012.01)
*G06Q 40/08* (2012.01)

(52) U.S. Cl.
CPC ........... *G06Q 10/087* (2013.01); *G06Q 10/08* (2013.01); *G06Q 40/08* (2013.01)

(58) Field of Classification Search
None
See application file for complete search history.

(56) References Cited

U.S. PATENT DOCUMENTS

| | | | |
|---|---|---|---|
| 5,429,392 A | 7/1995 | Loving | |
| 6,259,367 B1 * | 7/2001 | Klein | B25J 9/08 235/375 |
| 6,546,088 B2 | 4/2003 | Campbell | |
| 7,424,473 B2 * | 9/2008 | Orton, III | G06Q 10/10 |
| 7,956,744 B2 | 6/2011 | Wagner | |
| 7,979,068 B2 | 7/2011 | Caplan et al. | |
| 8,973,813 B2 * | 3/2015 | Penny | H04M 3/42008 235/375 |
| 2003/0118191 A1 * | 6/2003 | Wang | G07B 17/00508 380/285 |
| 2009/0018416 A1 | 1/2009 | Walker et al. | |
| 2009/0184160 A1 * | 7/2009 | Nudd | B65D 27/06 235/375 |

(Continued)

OTHER PUBLICATIONS

Leckart, Steven; "What is That? Let Your Smartphone Have a Look", Aug. 31, 2011, The New York Times, pp. 1-4.*

(Continued)

*Primary Examiner* — Bruce I Ebersman
*Assistant Examiner* — David P Sharvin
(74) *Attorney, Agent, or Firm* — Thomas | Horstemeyer, LLP

(57) ABSTRACT

Disclosed are various embodiments for facilitating the return of lost items and maintaining an inventory registry of items which are all associated with a user who participates in an item protection program. A user may update an inventory registry to include items that are associated with the user. Therefore, the user may be able to manage his or her items in one place and determine the overall value associated with the items. Additionally, a unique identifier code may be assigned to each user participating in a user protection program. The unique identifier code may be embedded on an item or item label so that it may be scanned to identify the owner of the item. Therefore, if the item were lost, the finder may scan the unique identifier code using an item protection application to initiate the return of the lost item to the owner.

20 Claims, 9 Drawing Sheets

(56) References Cited

U.S. PATENT DOCUMENTS

2012/0267430 A1    10/2012  Penny et al.

OTHER PUBLICATIONS

"How a lost and found label service works using microdots from MicroTrax" retrieved from the web on Feb. 7, 2013. http://www.micro-trax.com/how-it-works/layers-of-protection/.

"How Micro-Trax cell phone tracking and asset protection works" retrieved from the web on Feb. 5, 2013. http://www.micro-trax.com/how-it-works/.

"Micro Trax—Effective theft protection and asset tracking" retrieved from the web on Feb. 7, 2013. http://www.micro-trax.com/.

* cited by examiner

FACILITATION OF LOST ITEM RETURN AND ITEM INVENTORY

BACKGROUND

Individuals accumulate and discard items over time constantly affecting the value of their overall wealth. Since individuals typically possess a large amount of items and constantly change their possessions either by adding or removing items, it is difficult to track and determine the overall value of the items owned and/or possessed by an individual at a given time. Additionally, if the owner of an item loses the item, a finder of the item may be inconvenienced not only by having to determine the identity of the owner, but also in trying to return the item to the owner.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
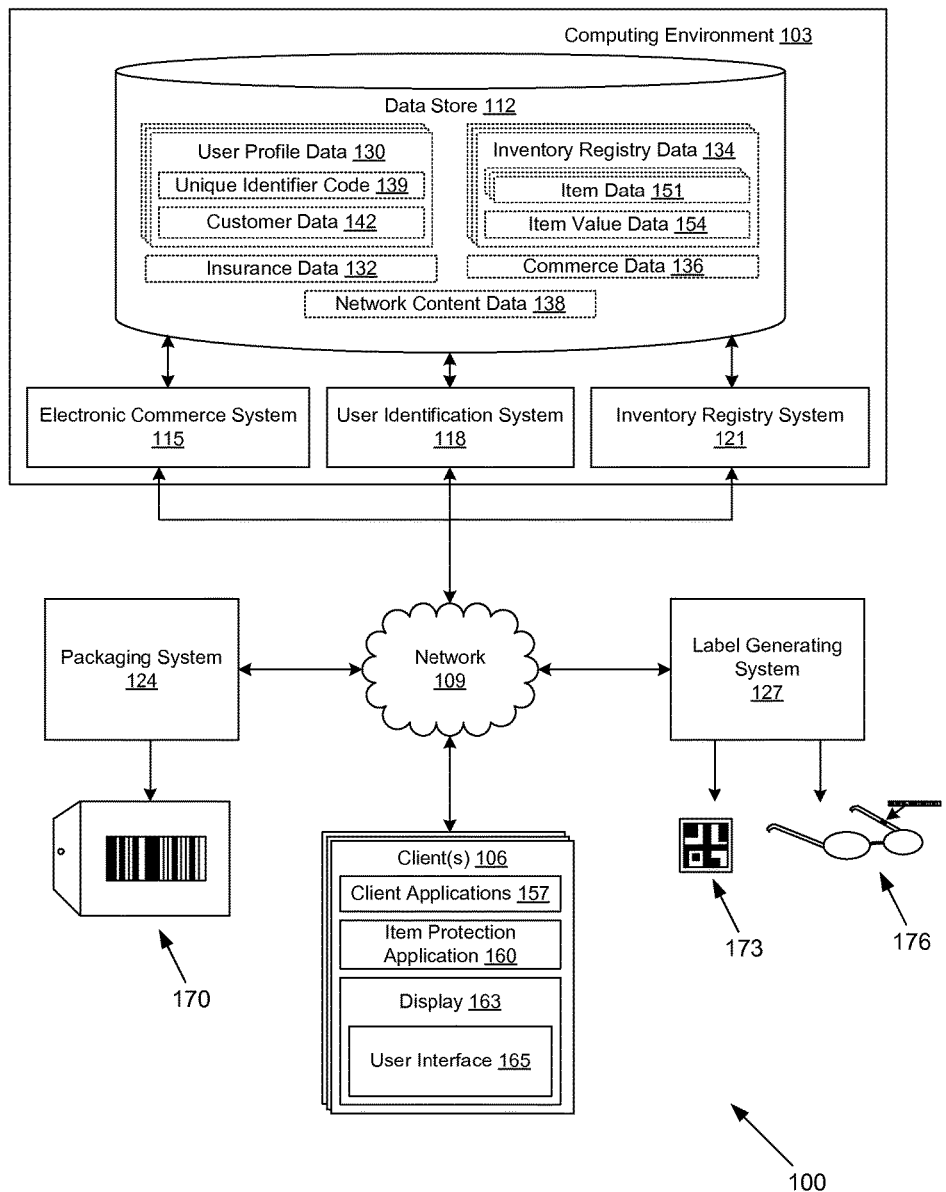
FIG. 1 is a drawing of a networked environment according to various embodiments of the present disclosure.

The current disclosure relates to the protection and safety of items by facilitating lost item return and maintaining an item inventory of items that associated with a user registered to participate in an item protection program. Items may include any goods that may be offered for sale, purchase, rental, lease, and/or any other form of consumption that may be appreciated.

In some embodiments, the item protection program generates a unique identifier code that is unique to a registered user with respect to other registered users. As such, the unique identifier code may be embedded on items and/or labels that may be affixed to items. An item protection application executed on a client may be used to scan the unique identifier code on an item in order to identify the user associated with the item. For example, if an owner of an item containing the unique identifier code loses that item and the item is found by a third-party entity, the third-party entity may access the item protection application on a client and scan the unique identifier code to initiate the return of the item. The item protection application may then identify the owner of the item based at least in part on the scanned unique identifier code and facilitate the return of the lost item. Upon determining the identity of the owner of the lost item, the item protection application may interact with other systems so that a pre-paid envelope or other type of packaging that includes the address or encoded address of the owner may be sent to the finder. Therefore, the third party finder merely has to place the lost item in the received packaging and place in a delivery system (e.g., United States Postal Service) so that the item is subsequently returned to the owner while maintaining the privacy of the owner and creating minimal inconvenience to the third-party entity.

In other embodiments, the item protection program may be used to facilitate the protection of items by maintaining an inventory registry of items associated with a user registered to participate in the item protection program. A user may interact with the item protection program via an item protection application executed on a client device. By being able to manage an inventory of items that are associated with a user, the item protection program may be able to provide various services that may be beneficial to a user with respect to at least the protection and safety of the items. For example, the item protection program may be able to determine the overall value of the items included in an inventory registry, determine the risk of loss associated with the inventory registry of items associated with the user, provide insurance or insurance quotes from third party insurers, facilitate the resale and/or trade-in of items, and/or provide or facilitate other services associated with the maintenance of an inventory registry of items. In some embodiments, the user may add and/or remove items from the item registry via an item protection application on a client based at least upon an item identifier and/or a captured image of the item. In the following discussion, a general description of the system and its components is provided, followed by a discussion of the operation of the same.

With reference to FIG. 1, shown is a networked environment 100 according to various embodiments. The networked environment 100 includes a computing environment 103, a packaging system 124, a label generating system 127 and one or more clients 106 in data communication via a network 109. The network 109 includes, for example, the Internet, intranets, extranets, wide area networks (WANs), local area networks (LANs), wired networks, wireless networks, or other suitable networks, etc., or any combination of two or more such networks.

The computing environment 103 may comprise, for example, a server computer or any other system providing computing capability. Alternatively, the computing environment 103 may employ a plurality of computing devices that are arranged, for example, in one or more server banks or computer banks or other arrangements. Such computing devices may be located in a single installation or may be distributed among many different geographical locations. For example, the computing environment 103 may include a plurality of computing devices that together may comprise a cloud computing resource, a grid computing resource, and/or any other distributed computing arrangement. In some cases, the computing environment 103 may correspond to an elastic computing resource where the allotted capacity of processing, network, storage, or other computing-related resources may vary over time.

Various applications and/or other functionality may be executed in the computing environment 103 according to various embodiments. Also, various data is stored in a data store 112 that is accessible to the computing environment 103. The data store 112 may be representative of a plurality of data stores 112 as can be appreciated. The data stored in the data store 112 for example, is associated with the operation of the various applications and/or functional entities described below.

The components executed on the computing environment 103, for example, include an electronic commerce system 115, a user identification system 118, an inventory registry system 121, and other applications, services, processes, systems, engines, or functionality not discussed in detail herein. The electronic commerce system 115 is executed in order to facilitate the online purchase of items over the network 109 through an electronic marketplace in which multiple merchants participate. The electronic marketplace may be operated by a proprietor who may also be a merchant. The electronic commerce system 115 also performs various backend functions associated with the online presence of a merchant in order to facilitate the online purchase of items. For example, the electronic commerce system 115 may generating network content such as web pages, mobile application data, or other forms of content that are provided to clients 106 for the purposes of selecting items for purchase, rental, download, lease, or other forms of consumption.

The user identification system 118 is executed to facilitate the identification of users associated with items that are labeled with a unique identifier code 139. The user identification system 118 may generate unique identifier codes 139 for each user that participates in an item protection program. The inventory registry system 121 maintains inventory registries of items where each inventory registry may be associated with different users that participate in the item protection program.

The data stored in the data store 112 includes, for example, user profile data 130, insurance data 132, inventory registry data 134, commerce data 136, network content data 138 and potentially other data. User profile data 130 may include various information collected from or generated regarding users. Such information may include a unique identifier code 139, customer data 142, and/or other information.

The unique identifier code 139 relates to code that is generated by the user identification system 118 and is unique to a user. As such, the unique identifier code 139 corresponding to one user account is unique and different from the unique identifier code 139 corresponding to any of the other user accounts. The unique identifier code 139 may be embedded on an object in form of a barcode, quick response (QR) code, radio frequency identifier (RFID) and/or other form of machine-readable encoding.

The customer data 142 may include interaction history with the electronic commerce system 115, user login information, user address information, email address(es), and/or other information associated with a user. The insurance data 132 may include data corresponding to insurance coverage associated with items included in an item registry. The insurance data 132 may include insurance quotes, insurer information, insurance payment information, and/or other information that relates to insurance relating to items included in the inventory registry maintained by the inventory registry system 121.

The inventory registry data 134 may include data associated with at least one inventory of items associated with a user account. The inventory registry data 134 may include item data 151, item value data 154 and/or other information. The item data 151 may correspond to various items owned and/or leased by a user associated with a user account. Such item data 151 may include titles, descriptions, Universal Product Codes (UPCs), prices, and so on. The item value data 154 may correspond to information relating to the past values, current values, and projected values of each item associated with an inventory registry and/or other information.

The commerce data 136 may include data related to the operation of the electronic commerce system 115. Such data may include, for example, item catalog data, item suggestions data, shopping cart data, checkout data, order data, merchant data, and/or other data. The network content data 138 includes text, images, video, audio, templates, and any other content that may be served up by the electronic commerce system 115, the user identification system 118, and/or the inventory registry system 121.

The client 106 is representative of a plurality of client devices that may be coupled to the network 109 The client 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 106 may include a display 163. The display 163 may comprise, for example, one or more devices such as liquid crystal display (LCD) displays, gas plasma-based flat panel displays, organic light emitting diode (OLED) displays, LCD projectors, or other types of display devices, etc.

The client 106 may be configured to execute various applications such as client applications 157, an item protection application 160 and/or other applications. The item protection application 160 may facilitates the return of a lost item associated with a user participating in an item protection program and facilitate the management of and ability to update an inventory registry of items associated with the user.

The client applications 157 may be executed in a client 106, for example, to access network content served up by the computing environment 103 and/or other servers, thereby rendering a user interface 165 on the display 163. Each client application 157 may, for example, correspond to a browser, a mobile application, a shopping application, a banking application a music playing application, and/or other applications that my request information from users to operate from time to time.

The packaging system 124 may be employed to prepare and ship packaging units 170 to respective shipping destinations. The packaging units 170 may comprise, for example, envelopes, boxes, crates, cases, encasements, bundles, packets, cartons, bins, receptacles, containers, capsules, and other type of packaging. The packaging system 124 may generate address labels that may be affixed on the packaging units 170. The packaging system 124 may also generate address labels that may be obtained by a user without being affixed on the packaging units 170. For example, a user may download and/or print an address label through the item protection application 160 and/or other application capable of interacting with the packaging system 124. The address labels may include the actual physical address of a shipping destination and/or an encoded address associated with the shipping destination. The encoded address may be in the form of a barcode, QR code, RFID, and/or other machine-readable encoding.

The label generating system 127 may be employed to generate encoded labels 173 with unique identifier code 139. The labels may be in the form of a sticker and/or other adhesive material that may be affixed on an item 176. The labels may be of different sizes and/or shapes. For example, a label may be small enough to affix to a pair of eyeglasses, key, watch, and/or any other small item 176. The label generating system 127 may also be employed to embed a unique identifier code 139 to items 176 purchased through the electronic commerce system 115.

Next, a general description of the operation of the various components of the networked environment 100 is provided. To begin, a user may opt to participate in an item protection program that may maintain an inventory of items associated with the user as well as provide an approach for facilitating the return of items lost by the user. In one non-limiting example, the user may opt to participate in the item protection program by having a user account through an electronic commerce system 115. In another non-limiting example, the user may also opt to participate in the item protection program by registering through an item protection application 160 that may be downloaded, installed, and executed on a client 106.

In various embodiments, upon registering to participate in the item protection program, a unique identifier code 139 may be generated by the user identification system 118. Although the unique identifier code 139 may be in the form of a barcode, RFID tag, or quick response (QR) code, the unique identifier code 139 may comprise some other type of machine readable code that is unique to the user. Additionally, the unique identifier code 139 may represented by a compact image and may be readable by client devices 106 having a camera.

In one non-limiting example, when embedded on an encoded label 173 and/or an item 176, the unique identifier code 139 may be represented by a pixelated image. For example, assume that the live human population on earth is ten billion. As such, the user identification system 118 needs to generate at least ten billion unique identities to compensate for the population so that if every individual on earth participated in the item protection program, each individual may be assigned a unique identity. In one non-limiting example, the number of pixels required to represent the unique identifier code 139 using a number of only black and white pixels in a square pattern may be determined by the formula "$2^{n\cdot n}=10B$," where "n" represents a number of pixels. The closest integer value for "n" in solving the equation is six pixels. Due to the small amount of pixels required to generate at least ten billion unique identifiers, the unique identifier code 139 may be represented by an image comprising a small amount of pixels that may be compact enough to embed on a small encoded label 173 that may be affixed on items 176 that are both small and large in size.

In another non-limiting example, the unique identifier code 139 may be embedded onto an encoded label 173 and/or an item 176 in the form of a symbol. The symbol may be an image created by the user, selected by, and/or modified by the user during the registration process of the item protection program or at a later time. For example, when opting to participate in the item protection program, the user may select the fleur de lis symbol from a list of images displayed on a user interface 165 rendered by the item protection application 160. Upon selection, the user may further modify the selection. For example, the user may select a particular color and/or pattern with respect to the symbol. As such, the unique identifier code 139 may be embedded on an encoded label 173 containing a fleur de lis symbol as selected, created, and/or modified by the user.

When the unique identifier code 139 is generated by the user identification system 118, any item(s) 176 purchased and/or leased by the user through the electronic commerce system 115 may be processed through the label generating system 127 and embedded with the unique identifier code 139. The unique identifier code 139 may be physically embedded on the item 176 or it may be embedded on an encoded label 173 that may be affixed to the item 176. A user may also request through the item protection application 160 and/or the electronic commerce system 115 to receive encoded labels 173 that the user and/or person associated with the user may affix to items 176 owned and/or leased by the user. For example, a user may request fifty encoded labels 173 encoded with the unique identifier code 139 associated with the user. Upon receipt of the encoded labels 173, the user may attach the encoded labels 173 onto items 176 associated with the user, for example, eyeglasses, cellular telephone, keys, bags, jackets, etc.

In some embodiments, the unique identifier code 139 embedded on an item 176 or an encoded label 173 may also include item identifier code that may be used to identify the item 176. For example, while the unique identifier code 139 may be unique for a particular user, it may include additional code that may vary for each item 176 and/or encoded label 173. For example, assume a user requested and received fifty encoded labels 173 encoded with the unique identifier code 139 associated with the user and further assume that the user attached the encoded labels 173 onto items 176 that are associated with the user. For at least one of the items 176 with which the user attached an encoded label 173, the user may scan the encoded label 173 via the item protection application 160 and identify the item 176 that is associated with the scanned unique identifier code 139 having item identifier code. In this manner, the item 176 may also be identified by the encoded label 173 affixed to item 176 associated with the user. That is to say, each encoded label 173 may be unique to the combination of the user and the respective item 176.

In one embodiment, if an item 176 that is labeled with a unique identifier code 139 is lost by the user, the finder of the lost item 176 may be able to return the lost item 176 to the user through the use of the item protection application 160. If the finder of the lost item 176 or some other third-party entity associated with the finder does not have the item protection application 160 on his or her client device 106, he or she may download the item protection application 160 from the electronic commerce system 115. The finder or other third-party entity may request the item protection application 160 to scan the encoded label 173 on the lost item 176 using a camera on a client device 106. The item protection application 160 may interact with the user identification system 118 to identify the owner of the lost item 176. The user identification system 118 may identify the owner based on the unique identifier code 139 since each unique identifier code 139 is unique to each registered user of the item protection program.

In one embodiment, the user identification system 118 may notify the owner that the lost item 176 has been found. The notification may be in the form of an electronic message, such as, for example, an email message, an instant message, a text message, a message embedded within a network page, or other type of notification.

In another embodiment, the user identification system 118 may receive contact information, which may include, for example, a shipping address, email address, or other type of address that is associated with the finder from the item protection application 160. For example, the item protection application 160 may provide a user interface 165 that a finder or other third-party entity associated with the finder may use to input a shipping address. The item protection application 160 may also request and obtain information from the finder or other third-party entity with respect to lost item 176. For example, the item protection application 160 may ask the finder or other third-party entity to estimate the size and/or weight of the lost item 176 so that an appropriate packaging unit 170 may be shipped to the finder or other third-party entity associated with the finder. Alternatively, the item 176 may be identified by the item protection application 160 via the user identification system if the scanned unique identifier code 139 includes item identifier code that is specific to an item that is associated with the tem identifier code. Regardless of how the item 176 is identified for purposes of determining the appropriate type of packaging unit 170, the finder or other third-party entity associated with the finder may insert the lost item inside the received packaging unit 170 that is suitable for the lost item 176 and ship to a shipping address that corresponds to the owner. The item protection application 160 may send this information to the user identification system 118 and/or the packaging system 124 for further processing.

In another embodiment, the packaging system 124 may label an item packaging unit 170 of suitable size with an address associated with the owner. The address may be embedded directly on the item packaging unit 170 or on a packaging label that may be affixed to the item packaging unit 170. The address may that of the actual physical address associated with the owner or an encoded address that comprises machine readable code that identifies the physical address associated with the owner.

For example, for security and privacy reasons, the packaging system 124 may generate machine readable code which may be represented in a form such as for example, a barcode, quick response (QR) code or any other machine readable encoding. The owner may request that his or her shipping address be encoded on the packaging unit 170 so that the finder of the lost item 176 and/or other third-party entity associated with the finder will not be able to determine the identity and/or the actual physical location of the user.

The packaging system 124 may label a second packaging unit 170 with the shipping address associated with the finder. The second packaging unit 170 will be used to transport the item packaging unit 170 to the finder or other third-party entity associated with the finder. As such, the packaging system 124 will ship the second packaging unit 170 carrying the item packaging unit 170 to the shipping address associated with the finder. Additionally, all fees associated with the shipment of the second packing unit 170 and/or the item packaging unit 170 with the lost item 170 may be pre-paid so that the entire process is of minimal inconvenience to the finder.

In one non-limiting example, the finder may receive the second packaging unit 170 carrying the item packaging unit 170 and subsequently insert the lost item 176 in the item packaging unit 170. The finder or other third-party entity associated with the finder will then place the item packaging unit 170 in the appropriate packaging carrier service. For example, if the item packaging unit 170 may be shipped through the United States Postal Service, the finder may place the item packaging unit 170 with his or her outgoing mail. However, the item packaging unit 170 may be shipped through any carrier service that has the capabilities of decoding the encoded address label associated with the physical shipping address of the owner.

In another non-limiting example, the finder or other third-party entity associated with the finder may place the item packaging unit 170 containing the lost item 176 in a convenient drop-off location, container, and/or bin. For example, the finder may place the item packaging unit 170 in a secure drop-off bin such that the item packaging unit 170 will eventually be shipped and/or delivered to the owner.

Alternatively, in another example, the finder may provide the packaging unit 170 and only request an address label containing an actual or encoded address associated with the owner. For example, the finder may download and/or print an address label through the item protection application 160 and/or other application capable of interacting with the packaging system 124. As such, the finder may attach the address label and attach it to a packaging unit 170 that is provided by the finder. Accordingly, the packaging system 124 does not provide the packaging unit 170 for the finder to insert the lost item. However, the packaging system 124 may provide the address label which may include an encoded address associated with the owner. Regardless, the finder may still attach the address label to a packing unit 170, insert the lost item 176 in the packaging unit 170, and take the necessary steps to return the packaging unit 170 containing the lost item 176 to the owner (e.g. delivering to a carrier service, placing in a drop-off container, etc.).

Further, in another example, if the finder is interested in the lost item 176 and would like to purchase the equivalent item 176, item protection application 160 may provide selectable content that would allow the finder to purchase an equivalent item 176 via the electronic commerce system 115. For example, if the lost item 176 has been identified via the item protection application 160, the user protection application 160 may be able to interact with the electronic commerce system 115 to provide the ability for the finder to purchase an item 176 equivalent to the identified lost item 176. Accordingly, the finder may return the lost item 176 to the owner and purchase the equivalent item 176 for his or her own needs.

In another embodiment, a user may use the item protection application 160 to manage an inventory of his or her items 176. The item protection application 160 may interact with the inventory registry system 121 to update items in an inventory associated with a user. As such, the inventory registry system 121 may maintain the inventory, determine the value of the inventory and/or a portion of the items, and determine whether an item needs to be replaced and/or is a non-current model, facilitate the resale of an item, determine any insurance risks associated with the inventory, and/or perform other tasks associated with the maintenance of an item inventory.

In one non-limiting example, the item protection application 160 may identify the current user based at least in part upon a user login, scanned unique identifier code 139, email address, facial recognition, and/or any other form of identification. For example, the item protection application 160 may scan a unique identifier code 139 to determine the identity of the current user and access the corresponding account information. As previously discussed, some items 176 owned by the user may be embedded with or include an encoded label 173 that is embedded with a unique identifier code 139. The user may have a unique identifier code 139 that is unique to him or her. As such, by scanning the unique identifier code 139 on an item 176 that includes the unique identifier code 139, the user may be identified by determining the corresponding user account.

In another embodiment, the item protection application 160 may add items to an inventory registry via the inventory registry system 121. In one non-limiting example, the item protection application 160 may identify an item 176 to be added by scanning a machine readable item identifier on the item 176. The machine readable item identifier may be a Universal Product Code (UPCs), barcode, QR code, and/or any other machine readable encoding that may be used to identify the item. In another non-limiting example, the item protection application 160 may capture an image of the item that the user wants to add to his or her item inventory. As such, the item protection application 160 may use various algorithms to try and identify the item.

In another non-limiting example, the item protection application 160 may request that the user verify that the correct item 176 was identified. For example, if the item protection application 160 captures an image of a vacuum it may only be able to determine from the image that the vacuum is a "Brand A" vacuum. However, the item protection application 160 may be unable to determine the exact model number of the vacuum. As such, the item protection application 160 may provide a user interface 165 showing four different models of the vacuum for the user to select the appropriate model. Upon the user input selecting the appropriate model of the vacuum, the item protection application 160 may interact with the inventory registry system 121 to correctly add the identified item to the corresponding inventory registry. In another non-limiting example, the item protection application 160 may provide the user with a user interface 165 that the user may use to search for the particular item 176 that they want to add to his or her item inventory.

Upon identification of the item to be added, the item protection application 160 may interact with the inventory registry system 121 to determine the appropriate item data 151 corresponding with the item and add the item to the inventory registry data 134. The item data 151 may be accessed and/or generated from the commerce data 136.

In another embodiment, the item protection application 160 may remove an item 176 from the inventory. A user may select a component on a user interface 165 rendered by the item protection application 160 requesting for an item 176 to be removed and/or unregistered. For example a user may select to remove and/or unregister an item 176 if the item 176 is no longer owned by the user. In one non-limiting example, the item protection application 160 may facilitate the resale of an item. As such, when the item 176 is deemed sold to another owner, the item 176 is no longer associated with the user and may be removed from the inventory registry data 134 associated with the user.

In another embodiment, the inventory registry system 121 may be able to monitor whether any of the items 176 associated with an inventory registry data 134 are related to newer model items and/or whether any of the items in the inventory registry data 134 have become discontinued. In one example, assume that the owner has a blender corresponding to "Brand A—Model No. B12345." However, the inventory registry system 121 may be able to determine that Brand A has released a newer model of that same blender. As such, the inventory registry system 121 may be able to notify the user through the item protection application 160 and/or the electronic commerce system 115 that his or her currently owned blender is not the newest model of the blender.

In another embodiment, the inventory registry system 121 may be able to update the value of the items 176 included in an inventory registry associated with a user. For example, the inventory registry system 121 may be able to determine the current, past and/or future estimated values for the items 176. Through interacting with the electronic commerce system 115 and being able to access the commerce data 136 relative to each of the items 176, the inventory registry system 121 may determine the value of the items 176. For example, if the user has a television listed in his or her corresponding inventory registry, the inventory registry system 121 may determine the current new sale price of the television and may also determine the current re-sale price of the television. As such, the item protection application 160 may be able to provide the user with the current item value data 154 associated with the inventory registry as determined by the inventory registry system 121. Therefore, the user may be able to manage his or her inventory and have knowledge of the overall value of his or her inventory of items 176.

In another embodiment, the inventory registry system 121 may facilitate the opportunity to insure the items 176 associated with the item protection program. In one non-limiting example, the inventory registry system 121 may determine a risk associated with an individual user and/or multiple users registered with the item protection program. In determining the risk of loss associated with the maintained inventory registries, the inventory registry system 121 may employ a scoring algorithm that considers various factors associated with a user. For example, the factors may include the value of each item 176, an address associated with the user, interaction history of the user associated with the electronic commerce system 115 and/or the item protection application 160, and/or any other factors that may be used to determine an insurance risk that may be used to provide to a potential insurer. The inventory registry system 121 may be able to determine the risk associated with the user and/or multiple users associated with the item protection program.

In some embodiments, the inventory registry system 121 may be able to provide perspective insurers with the determined risk associated with a particular user with respect to his or her inventory or items 176. Additionally, the inventory registry system 121 may provide perspective insurers with overall risk of the entire portfolio of at least a portion of the inventory registries associated with multiple users that are associated with the item protection program. As such, the inventory registry system 121 may be able to facilitate the ability for perspective insurers to bid insurance prices with respect to an individual inventory registry and/or multiple inventory registries.

In some embodiments, the item protection application 160 may allow users to view different insurance bids with respect to his or her inventory registry. In other embodiments, the item protection application 160 may be able to select an insurer bid that corresponds to at least a portion of the entire portfolio of inventory registries associated in the item protection program. As such the item protection program may be able to offer insurance directly to the users. In some embodiments, the user may be able to opt to participate in the insurance portion via the item protection application 160. In some embodiments, a user may be able to process an insurance claim through the item protection application 160. As such, the user may be able to select that an item 176 in the item inventory has been damaged, lost, and/or stolen, and the item protection application 160 may be used to submit an insurance claim. As such, since the item value data 154 is already known, the claim may be easy to file and the user may quickly receive the replacement item 176. The item protection program may be able to provide insurance to each user associated with the item protection program based on an overall portfolio associated with the item protection program.

Referring next to FIGS. 2A-2E, shown are exemplary user interfaces 165 rendered by the item protection application 160 (FIG. 1) executed in a client 106 in the networked environment 100 (FIG. 1). The item protection application 160 is employed to facilitate the return of items 176 lost by a user and manage an inventory of items 176 owned and/or leased by a user. With respect to the return of items lost by a user, the item protection application 160 may be employed by a finder and/or other third-party entity associated with the finder. The finder or other third-party entity may use the item protection application 160 to scan a unique identifier code 139 embedded on the lost item or an encoded label 173 affixed to the lost item 176. As such, the owner may be identified and the finder or other third-party entity may receive a packaging unit 170 with an encoded address of the user and the finder or other third-party entity may place the lost item 176 in the packaging unit 170 to return to the owner. With respect to managing the inventory of the items 176 owned and/or leased by the user, the user may add and/or remove items 176 from an item registry, view a value associated with an item 176 and/or group of items 176, list items 176 for resale, trade-in items, learn of newer item models, purchase insurance covering the respective items 176, submit insurance claims with respect to insured items 176 that are stolen, lost, and/or broken, and/or other functions with respect to managing an inventory of items.

Figure 2A:
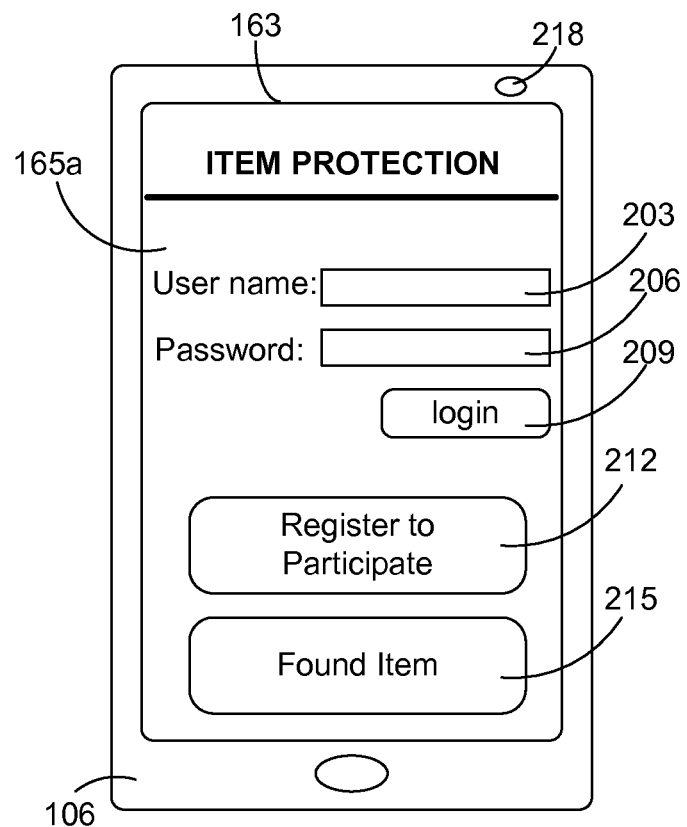
FIGS. 2A-2E are drawings of examples of user interfaces rendered by an information manager application executed by a client in the networked environment of FIG. 1 according to various embodiments of the present disclosure.

Beginning with FIG. 2A, the user interface 165a on the display 163 corresponds to an initial viewing screen of the item protection application 160 (FIG. 1) that may be shown when the item protection application 160 is accessed by a user on a client 106. In this example, the user interface 165a is shown on a client 106 having a camera 218. The user interface 165a includes a user name entry box 203, a password entry box 206, a login component 209, a register component 212 and a found item component 215. If the user is already a registered participant in the item protection program, the user may enter his or her login information into the user name entry box 203 and/or password entry box 206. Upon selection of the login component 209, the item protection application 160 may use data received from the user name entry box 203 and the password entry box 206 to identify the user accessing the item protection application. Accordingly, the item protection application 160 may initiate an identified user viewing screen as discussed in more detail with reference to FIG. 2B. If the user is not a registered participant in the user protection program, the user may select the register component 212. Upon selection of the register component 212 the item protection application 160 may initiate a registration screen which may obtain information associated with the user in order to register the user for participation of the user protection program. The found item component 215 may be selected regardless of whether the user is a registered participant in the program. Upon selection of the found item component 215, the item protection application 160 may initiate a scan user identifier screen as discussed in more detail with respect to FIG. 2C.

Figure 2B:
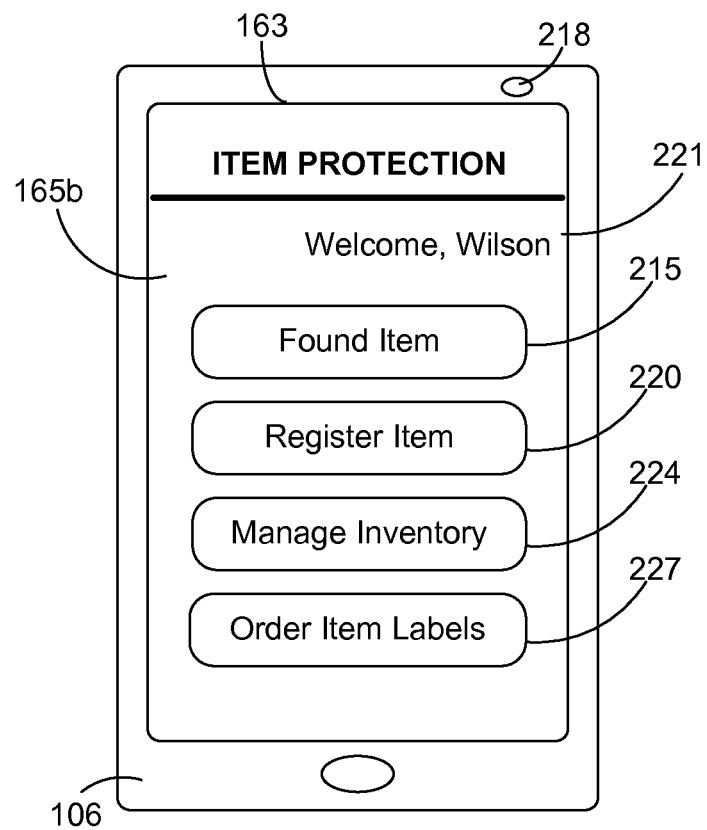

Moving on to FIG. 2B, the user interface 165b on the display 163 corresponds to an identified user viewing screen of the item protection application 160 that may be shown when following the identification of the user account associated with the user accessing the item protection application on a client 106. In this example, the user interface 165b is shown on a client 106 having a camera 218. The user interface 165a includes an identified user statement 221 that indicates the identified user. The user may have been identified based on login information entered on the initial viewing screen as discussed above with reference to FIG. 2A. The user interface 165b includes a found item component 215, a register item component 220, a manage inventory component 224 and an order item labels component 227. Selection of the found item component 215 initiates the approach associated with facilitating the return of a lost item. Upon selection of the found item component 215, the item protection application 160 may initiate a scan user identifier screen as discussed in more detail with respect to FIG. 2C. Selection of the register item component 220 may initiate the approach associated with adding an item 176 to an inventory registry of items 176 associated with the user. Selection of the manage inventory component 224 may initiate a manage inventory screen which may allow the user to manage his or her item inventory. Some examples of how the user may manage his or her inventory may include: unregistering and/or removing an item 176 from the inventory registry, viewing the value of the inventory and/or a portion of the inventory, determining whether an item in the inventory needs to be replaced and/or is no longer a current model, select to resale an item, purchase insurance for the inventory, and/or other task that may be associated with the maintenance of an item inventory. A user may select the order item labels component 227 to order encoded labels 173 embedded with the unique identifier code 139 associated with the user. As such, the user may attach the received encoded labels 173 to items 176 owned by the user so that if the user lost any of the items 176, a finder could use the item protection application 160 to identify user and facilitate the return of the lost item 176.

Figure 2C:
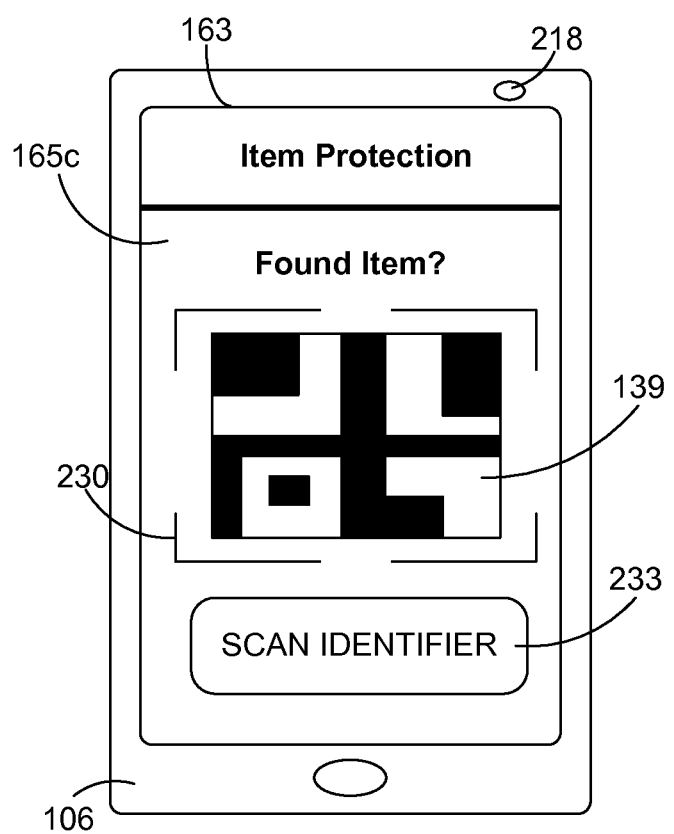

Turning now to FIG. 2C, the user interface 165c on the display 163 corresponds to a scan user identifier screen of the item protection application 160 that may be shown when the user selects the found item component 215 (FIG. 2A and FIG. 2B). In this example, the user interface 165c includes a unique identifier code 139 captured by the camera 218 of the client 106, an identifier boundary 230, and a scan identifier component 233. In one non-limiting example, the finder may adjust the client device such that the unique identifier code 139 fits area defined by the identifier boundary 230. Once the unique identifier code 139 fits into the area defined by the identifier boundary 230 the finder may select the scan identifier component 233 to scan the unique identifier code 139 to be used in identify the user associated with the lost item.

Figure 2D:
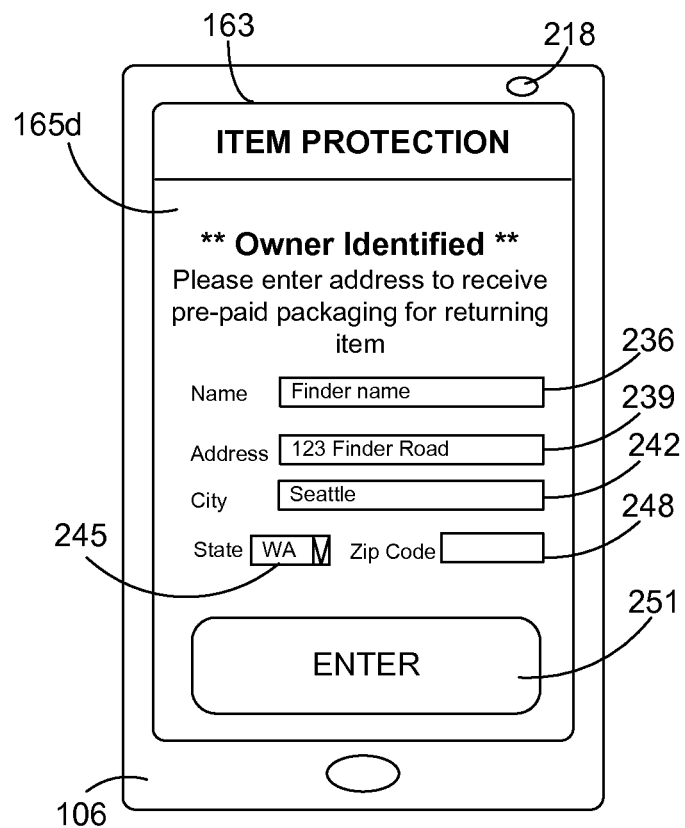

Moving on to FIG. 2D, the user interface 165d on the display 163 corresponds to a finder information screen of the item protection application 160 that may be shown when the owner of the lost item 176 has been found following the scanning of the unique identifier code 139. In this example, the user interface 165c includes a name component 236, an address component 239, a city component 242, a select state drop-box 245, a zip-code component 248, and an enter information component 251. In one non-limiting example, the finder may enter in shipping address information so that a packaging unit 170 to be used to return the lost item 176 to a shipping address associated with the owner may be shipped to the finder or associated third-party entity. It should be noted that if the finder is a registered user of the item protection program, the item protection application 160 may not need to retrieve address information related to the finder unless the finder requests to enter address information that is different from the information included in the user profile data 130 associated with the finder.

Figure 2E:
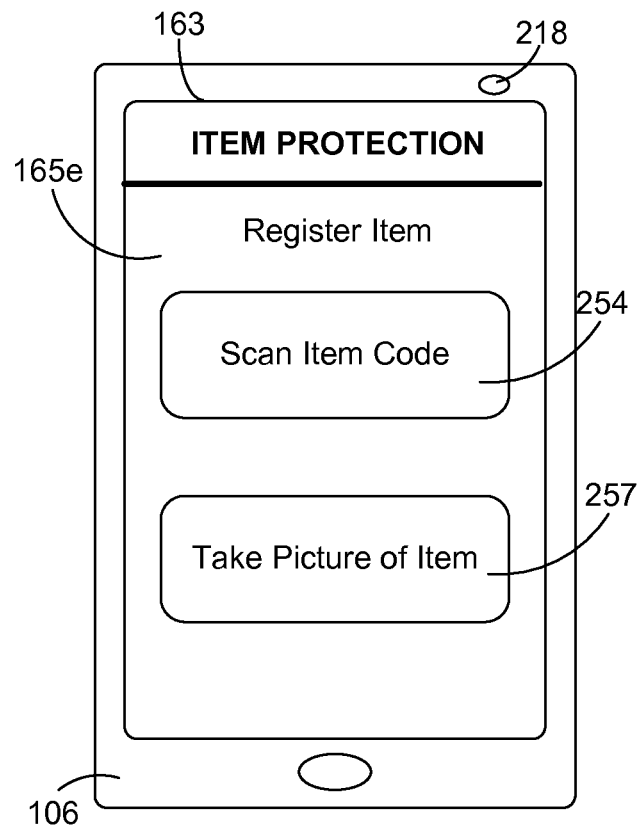

Referring next to FIG. 2E, the user interface 165e on the display 163 corresponds to a register item screen of the item protection application 160 that may be shown when the user selects the register item component 220 (FIG. 2B) included in the initial viewing screen of the item protection application 160. In this example, the user interface 165e includes a scan item identifier component 254 and a take picture component 257. The selection of the scan item identifier component 254 may initiate a scan item identifier viewing screen which similar to the user identifier viewing screen in FIG. 2C, may be used to scan the item identifier code that may be used to identify the item 176. The selection of the take picture component 257 may initiate a picture viewing screen which may be used to facilitate the capturing of an image of an item 176 that is to be identified and subsequently added to the item registry.

Figure 3:
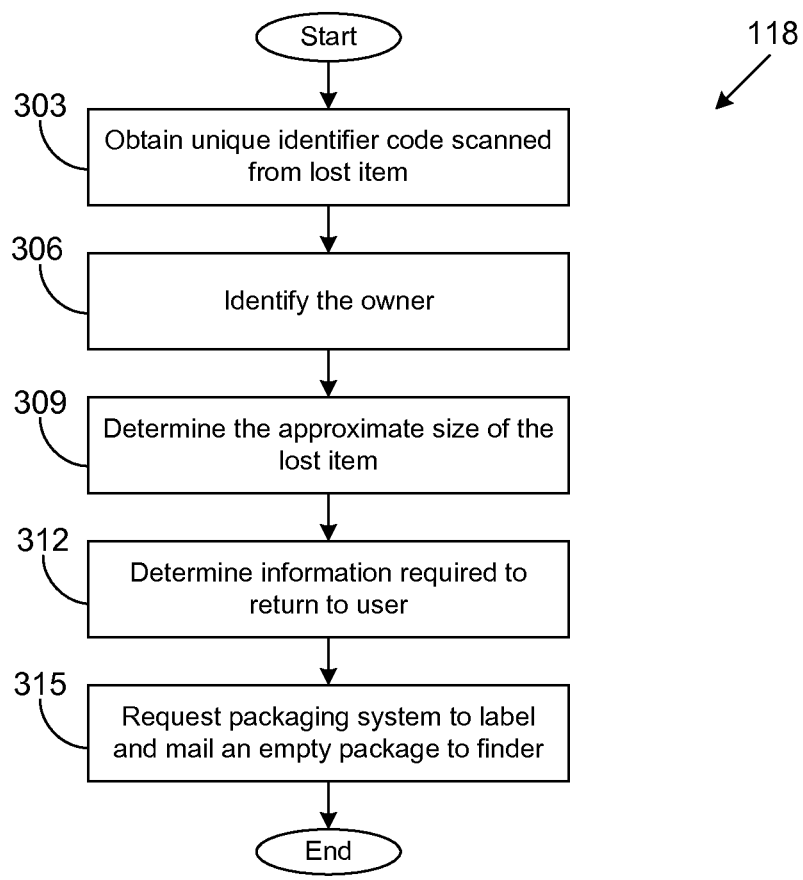
FIG. 3 is a flowchart illustrating one example of functionality implemented as portions of a user identification system executed in a computing environment in the networked environment of FIG. 1 according to various embodiments of the present disclosure.

Turning now to FIG. 3, shown is a flowchart that provides one example of the operation of a portion of the user identification system 118 according to various embodiments. It is understood that the flowchart of FIG. 3 provides merely an example of the many different types of functional arrangements that may be employed to implement the operation of the portion of the user identification system 118 as described herein. As an alternative, the flowchart of FIG. 3 may be viewed as depicting an example of steps of a method implemented in the computing environment 103 (FIG. 1) according to one or more embodiments.

FIG. 3 illustrates an example of how the user identification system 118 interacts with the item protection application 160 and the packaging system 124 to assist in the return of a lost item 176 to an owner. The user identification system 118 may be used to identify the owner and request the shipment of a packaging unit 170 to the owner.

Beginning with box 303, the user identification system 118 obtains from an item protection application 160 executed on a client, a scanned image of unique identifier code 139 affixed to a lost item 176. The unique identifier code 139 is scanned from a lost item 176 found by a finder. The finder may access the item protection application 160 to scan the unique identifier code 139 from the lost item 176. As such, the item protection application 160 transmits the scanned unique identifier code 139 to the user identification system 118 for identification.

In box 306, the user identification system 118 identifies the owner. The user identification system 118 may identify the owner by comparing the scanned unique identifier code 139 with each unique identifier code 139 included in the user profile data 130 for each registered user. Since the unique identifier code 139 is unique to a specific user, the owner is identified when the scanned unique identifier code 139 matches the unique identifier code 139 associated with the owner.

In addition, the user identification system 118 may send a notification to the owner that the lost item 176 has been found. The notification may be in the form of an electronic message, such as, for example, an email message, an instant message, a text message, a message embedded within a network page, or other type of notification.

In box 309, the user identification system 118 determines the approximate size of the lost item 176. The user identification system 118 may obtain such information from the item protection application 160 executed on a client. The item protection application 160 may request via a user interface 165 that the finder enter the information related to the size and weight of the lost item. As such, the item protection application 160 may transmit the information to the user identification system 118. Alternatively, the item protection application 160 may be able to identify the item if the unique identifier code 139 includes item identifier code that is specific to an item 176 and previously identified by the owner associated with the lost item 176. In addition, the item may include a separate item identifier code that may be scanned by the item protection application 160 to identify the item. As such, the user identification system 118 may be able to determine characteristics relating to the lost item 176 by user input, item identifier code, and/or other approaches used to identify an item.

In box 312, the user identification system 118 may determine the information required to return the lost item 176 to the owner. For example, the item protection application 160 may request via a user interface 165 an address associated with the finder so that a packaging unit 170 that is to be used to return the lost item 176 to the owner may be sent to the finder. Therefore, an address associated with the finder needs to be obtained from the finder. The item protection application 160 may transmit the received address information to the user identification system 118 so that a request for the packaging unit 170 may be processed.

In box 315, the user identification system 118 may request the packaging system 124 to label and ship a packaging unit 170 to the finder. In some embodiments, the user identification system 118 may request that the packaging system 124 label the packaging unit 170 with an actual address associated with the owner. However, in other embodiments, the user identification system 118 may request that the packaging system 124 label the packaging unit 170 with an encoded address associated with the owner. Therefore, the finder will not have any knowledge of the address associated with the owner and the privacy of the owner is secure. In some embodiments, the finder may request to only receive an address label that is not affixed on a packaging unit 170. For example, the finder may download and/or print an address label through the item protection application 160 and/or other application capable of interacting with the packaging system 124. Upon requesting the packaging system 124 to label and send the packaging unit 170 and/or address label to the finder, the portion of the user identification system 118 ends.

Figure 4:
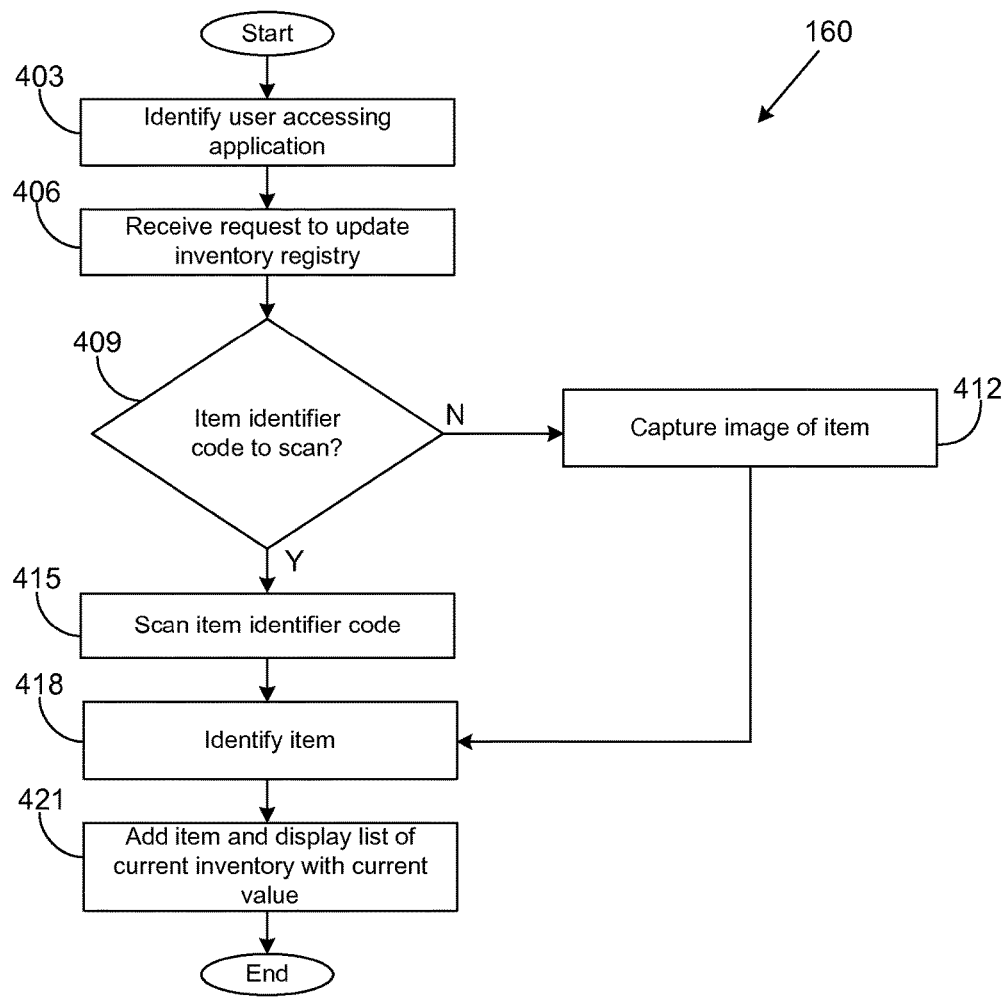
FIG. 4 is a flowchart illustrating one example of functionality implemented as portions of an item protection application 160 executed in a client device in the networked environment of FIG. 1 according to various embodiments of the present disclosure.

Turning now to FIG. 4, shown is a flowchart that provides one example of the operation of a portion of the item protection application 160 according to various embodiments. It is understood that the flowchart of FIG. 4 provides merely an example of the many different types of functional arrangements that may be employed to implement the operation of the portion of the user identification system 118 as described herein. As an alternative, the flowchart of FIG. 4 may be viewed as depicting an example of steps of a method implemented in the computing environment 103 (FIG. 1) according to one or more embodiments.

FIG. 4 illustrates an example of how the item protection application 160 may be used to update an item inventory associated with a participating user. The item protection application 160 may be accessed by the user on a client device 106 so that the user may manage and/or update his or her item inventory.

In box 403, the item protection application 160 identifies the user accessing the item protection application 160. In one example, the item protection application 160 may identify the user based on a default setting with respect to a prior use. In another example, the item protection application 160 may request the input of login information and/or other type of identifying input. In another example, the user may use the item protection application 160 to scan a unique identifier code 139 that may be used to via the user identification system 118 to identify the user.

In box 406, the item protection application 160 receives a request from a user input to update the inventory registry. For example, the user may interact with a user interface 165 similar to the one depicted in FIG. 2B. If the user would like to update the inventory registry, he or she may select the register item component 220 depicted in FIG. 2B. Although the inventory registry system 121 maintains the inventory registry data 134 associated with the user, the item protection application 160 facilitates the management and ability to update each respective inventory registry associated with each user.

In box 409, the item protection application 160 determines whether item identifier code may be used to identify the item 176 to be added and/or removed from the corresponding inventory. In one example, the item protection application 160 may provide a user interface 165 similar to the one shown in FIG. 2E. As such, if the user were to select the scan item identifier component 254, the item protection application 160 would determine that an item identifier code may be used to identify the item 176. However, if the user selected the take picture component 257, the item protection application 160 may determine that the identification may not be completed based on a scanned item identifier code. In another example, if the user attempts to scan item identifier code, but the item is not able to be identified based on the item identifier code, the item protection application 160 may determine that the identification of the item may not be based on an item identifier code. If the item protection application 160 is not able to scan item identifier code, the item protection application 160 proceeds to box 412. Otherwise, the item protection application 160 proceeds to box 415.

In box 412, the item protection application 160 may capture an image of the item to be identified. A user may use item protection application 160 to capture an image of the item 176 using a camera 218 (FIGS. 2A-2E) included in a client 106 (FIG. 1). The item protection application 160 may capture the image upon user input requesting the image to be captured.

In box 415, the item protection application 160 scans the item identifier code associated with an item 176. The item protection application 160 may provide a user interface 165 that allows the user to position the item identifier code associated with the item 176 within an identifier boundary 230 (FIG. 2C). The image of the item identifier code is captured by a camera 218 included on a client 106. When the item identifier code is positioned within the identifier boundary 221, the user may select a scan identifier component 233 requesting that the item protection application 160 scans the item identifier component. For example, if the user has an item 176 to add to his or her inventory registry, and the item 176 contains a UPC code, the user may position his or her client device 106 such that the camera 218 captures the UPC code associated with the item 176. When the UPC code is correctly positioned in the identifier boundary 230 on the corresponding user interface 165, the user may select the scan identifier component 233 to request that the item protection application 160 scans the item identifier code. As such, the item protection application 160 scans the item identifier code.

In box 418, the item protection application 160 identifies the item 176 based at least in part upon a scanned item identifier code or an image of the item. In one non-limiting example, the item protection application 160 transmits the scanned item identifier code to the inventory registry system 121 for identification. The inventory registry system 121 may access the commerce data 136 to search for a matching item identifier code. When a matching item identifier code is discovered, the inventory registry system 121 may determine that the item 176 corresponding to the matching identifier code is the item 176 intended to be identified. In another non-limiting example, the item protection application 160 may either locally or remotely via the inventory registry system 121, or other application or system, apply identification algorithms to a captured image of an item 176 to identify the item 176. For example, if the item protection application 160 captures an image of a particular type of telephone, the image may be processed through identification algorithms that may be able to determine the identity of the item 176. If the item protection application 160 is not able to determine the actual item 176, the item protection application 160 may be able to determine particular characteristics about the item 176 in order to provide the user with different items 176 to select. As such, the item protection application 160 may request input by the user in identifying the item 176. In another non-limiting example, the item protection application 160 may request verification of the identification from the user. For example, if it is determined that the item 176 is a "Brand A Model 123" telephone, the item protection application 160 may request verification from the user via a user interface 165 rendered on the client 106 that the identification is correct. The item protection application 160 may request verification for items 176 identified based at least in part upon item identifier code and/or a captured image of the item 176.

In box 421, the item protection application 160 via the inventory registry system 121 adds the item 176 to the item inventory associated with the identified user. For example, once the item 176 is identified, the inventory registry system 121 may access information associated with the item from at least the commerce data 136. This information may include item data 151, item value data 154, and/or other information corresponding to the identified item 176. Additionally, the item protection application 160 may obtain the inventory registry data 134 associated with the identified user and display at least a portion of the inventory information on a user interface 165 rendered on the client 106. For example, the item protection application 160 may display the names of each item 176 and the current value associated with item 176. Upon updating the inventory registry data 134 and displaying the item inventory on a user interface 165 rendered on the client 106, the portion of the item protection application 160 ends.

Figure 5:
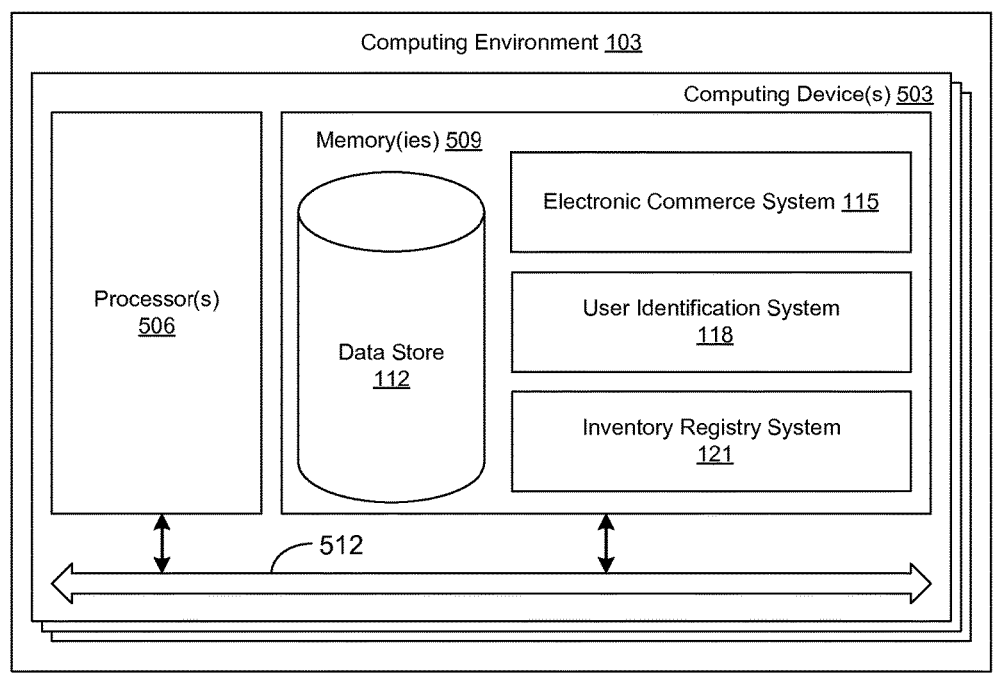
FIG. 5 is a schematic block diagram that provides one example illustration of a computing environment employed in the networked environment of FIG. 1 according to various embodiments of the present disclosure.

With reference to FIG. 5, shown is a schematic block diagram of the computing environment 103 according to an embodiment of the present disclosure. The computing environment 103 includes one or more computing devices 503. Each computing device 503 includes at least one processor circuit, for example, having a processor 506 and a memory 509, both of which are coupled to a local interface 512. To this end, each computing device 503 may comprise, for example, at least one server computer or like device. The local interface 512 may comprise, for example, a data bus with an accompanying address/control bus or other bus structure as can be appreciated.

Stored in the memory 509 are both data and several components that are executable by the processor 506. In particular, stored in the memory 509 and executable by the processor 506 are an electronic commerce system 115, a user identification system 118, an inventory registry system 121, and potentially other applications. Also stored in the memory 509 may be a data store 112 and other data. In addition, an operating system may be stored in the memory 509 and executable by the processor 506.

It is understood that there may be other applications that are stored in the memory 509 and are executable by the processor 506 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 509 and are executable by the processor 506. In this respect, the term "executable" means a program file that is in a form that can ultimately be run by the processor 506. Examples of executable programs may be, for example, a compiled program that can be translated into machine code in a format that can be loaded into a random access portion of the memory 509 and run by the processor 506, source code that may be expressed in proper format such as object code that is capable of being loaded into a random access portion of the memory 509 and executed by the processor 506, or source code that may be interpreted by another executable program to generate instructions in a random access portion of the memory 509 to be executed by the processor 506, etc. An executable program may be stored in any portion or component of the memory 509 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 509 is defined herein as including both volatile and nonvolatile memory and data storage components. Volatile components are those that do not retain data values upon loss of power. Nonvolatile components are those that retain data upon a loss of power. Thus, the memory 509 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 506 may represent multiple processors 506 and/or multiple processor cores and the memory 509 may represent multiple memories 509 that operate in parallel processing circuits, respectively. In such a case, the local interface 512 may be an appropriate network that facilitates communication between any two of the multiple processors 506, between any processor 506 and any of the memories 509, or between any two of the memories 509, etc. The local interface 512 may comprise additional systems designed to coordinate this communication, including, for example, performing load balancing. The processor 506 may be of electrical or of some other available construction.

Although the electronic commerce system 115, the user identification system 118, the inventory registry system 121, the item protection application 160, the client applications 157, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3 and 4 show the functionality and operation of an implementation of portions of the user identification system 118 and the item protection application 160 respectively. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 506 in a computer system or other system. The machine code may be converted from the source code, etc. If embodied in hardware, each block may represent a circuit or a number of interconnected circuits to implement the specified logical function(s).

Although the flowcharts of FIGS. 3 and 4 show a specific order of execution, it is understood that the order of execution may differ from that which is depicted. For example, the order of execution of two or more blocks may be scrambled relative to the order shown. Also, two or more blocks shown in succession in FIGS. 3 and 4 may be executed concurrently or with partial concurrence. Further, in some embodiments, one or more of the blocks shown in FIGS. 3 and 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce system 115, the user identification system 118, the inventory registry system 121, and the item protection application 160, that comprises software or code can be embodied in any non-transitory computer-readable medium for use by or in connection with an instruction execution system such as, for example, a processor 506 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system for increasing owner privacy and securing a return of an item, comprising:
　at least one server computing device;
　a packaging system in data communication with the at least one server computing device via a network;
　a label generating system in data communication with the at least one server computing device via the network; and
　at least one application executable by the at least one server computing device, wherein, when executed, the at least one application causes the at least one server computing device to at least:
　　generate a plurality of two-dimensional barcodes, wherein individual two-dimensional barcodes of the plurality of two-dimensional barcodes are uniquely associated with individual users of a plurality of users, the individual two-dimensional barcodes are embedded on a plurality of individual labels by the label generating system, and the plurality of individual labels are affixed to individual items that are associated with a corresponding user of the plurality of users in response to the corresponding user ordering a respective item among the individual items via the at least one server computing device;
　　in response to receiving a request from an item protection application rendered on a client device associated with a third-party entity over the network, identify an owner associated with the item based at least in part upon a specific two-dimensional barcode, the request comprising a scan of an image of the specific two-dimensional barcode captured by a camera device associated with the client device associated with the third-party entity, the third-party entity being associated with a finder of the item, the specific two-dimensional barcodes being embedded on an item label that is scanned by the camera device associated with the client device and affixed to the item;
　　present a user interface associated with the item protection application to prompt the finder of the item to make a determination that the finder of the item would like to purchase an equivalent of the item, the determination being based at least in part upon an input entered into the user interface by the finder of the item;
　　provide selectable content via a network page of an electronic commerce system accessible by the item protection application rendered on the client device associated with the third-party entity to allow a selection of the equivalent of the item for purchase;
　　facilitate a purchase of the equivalent of the item via the electronic commerce system in response to receiving a selection of the equivalent of the item via the selectable content from the client device;
　　request the packaging system to render an encoded address label on a pre-paid packaging unit in response to receiving address data associated with the third-party entity from a user participation application, wherein the encoded address label includes a machine-readable code that identifies a second address associated with the owner and obfuscates an identity of the owner from the finder for a security and a privacy of the owner; and
　　direct the packaging system to send the pre-paid packaging unit with the encoded address label to a first address associated with the third-party entity, the pre-paid packaging unit being selected based at least in part upon information associated with a size and weight of the item that is entered by the third-party entity.

2. The system of claim 1, wherein the specific two-dimensional barcode is associated with an identification of the item, and the packaging system selects an appropriate type of packaging unit based at least in part on a plurality of properties associated with the item.

3. A method, comprising:
　receiving, via at least one of one or more computing devices, a scanned image of a unique identifier code from a camera device associated with a client device associated with a finder of an item, the unique identifier code being embedded on the item by a label generating system, the item being associated with an owner;
　in response to receiving a request over a network from an item protection application rendered on the client device, identifying, via at least one of the one or more computing devices, the owner associated with the item based at least in part upon a comparison between the unique identifier code and an identified code included in a user profile associated with the owner;
　presenting, via at least one of the one or more computing devices, a user interface associated with the item protection application to prompt the finder of the item to make a determination that the finder of the item would like to purchase an equivalent of the item based at least in part upon input entered into the user interface associated with the item protection application by the finder of the item;
　providing, via at least one of the one or more computing devices, selectable content via a network page of an electronic commerce system accessible by the item protection application rendered on the client device associated with the finder of the item to allow a selection of the equivalent of the item for purchase;
　facilitating, via at least one of the one or more computing devices, a purchase of the equivalent of the item via the electronic commerce system in response to receiving the selection of the equivalent of the item from the client device;
　requesting, via at least one of the one or more computing devices, a packaging system to render an encoded address label on a pre-paid packaging unit, wherein the encoded address label includes a machine-readable code that identifies a second address associated with the owner while obfuscating an identity of the owner from the finder, the pre-paid packaging unit being selected based at least in part upon information associated with a size and weight of the item that is entered by the finder via an interaction with a user interface associated with the item protection application; and requesting, via at least one of the one or more computing devices, the packaging system to send the pre-paid packaging unit with the encoded address label to a first address associated with the finder.

4. The method of claim 3, wherein the unique identifier code comprises at least one of the following: a barcode, a radio frequency identifier (RFID), or a two-dimensional barcode.

5. The method of claim 3, wherein the owner is a specific owner of a plurality of owners registered to participate in an item protection program, the unique identifier code is a specific unique identifier code of a plurality of unique identifier codes, and the plurality of unique identifier codes are uniquely associated with the plurality of owners.

6. The method of claim 3, wherein the item is a specific item of a plurality of items associated with the owner, and the method further comprises instructing, via at least one of the one or more computing devices, the label generating system to embed the unique identifier code onto at least one of the plurality of items purchased by the owner from the electronic commerce system prior to delivery to the owner.

7. The method of claim 6, wherein the item is purchased by the owner from the electronic commerce system.

8. The method of claim 3, wherein the item is a specific item of a plurality of items associated with the owner, and further comprising instructing the label generating system to embed the unique identifier code onto at least one label, the at least one label being affixed to at least one of the plurality of items.

9. The method of claim 3, wherein the unique identifier code is embedded on a label affixed to the item, and the unique identifier code is depicted by a personalized symbol selected by the owner.

10. A system, comprising:

at least one computing device; and a user identification system comprising a plurality of computer instructions executable by the at least one computing device, wherein, when executed, the plurality of computer instructions cause the at least one computing device to at least:

generate a unique identifier code that is exclusive for a specific user of a plurality of users;

identify, in response to receiving a scan of the unique identifier code, the specific user as an owner of an item based at least in part upon the unique identifier code included on the item, the unique identifier code being embedded on the item by a label generating system;

request a packaging system to render an encoded address label on a pre-paid packaging unit, the encoded address label including a machine-readable code that identifies a first address associated with the specific user and obfuscates an identity of the specific user;

request the packaging system to send the pre-paid packaging unit to a second address associated with a third-party entity in possession of the item, the third-party entity being associated with a finder of the item and the pre-paid packaging unit being selected based at least in part upon information associated with a size and weight of the item that is entered by the third-party entity;

present a user interface associated with a user participation application rendered on a client device associated with the third-party entity to prompt the third-party entity in possession of the item to make a determination that the third-party entity in possession of the item would like to purchase an equivalent of the item based at least in part upon input entered into the user interface associated with the user participation application by the third-party entity in possession of the item;

provide selectable content via a network page of an electronic commerce system accessible by the user participation application rendered the client device associated with the third-party entity to allow a selection of the equivalent of the item for purchase; and facilitate a purchase of the equivalent of the item via the electronic commerce system in response to receiving the selection of the equivalent of the item from the client device.

11. The system of claim 10, wherein the plurality of computer instructions further cause the at least one computing device to at least direct the label generating system to generate a plurality of labels for affixing to a plurality of items, individual labels including the unique identifier code.

12. The system of claim 11, wherein the scan of the unique identifier code embedded on the item is received from a camera device associated with the user participation application rendered on the client device associated with the third-party entity in possession of the item.

13. The system of claim 10, wherein a plurality of items associated with the specific user are embedded with a label with the unique identifier code.

14. The system of claim 10, wherein the unique identifier code comprises at least one of the following: a barcode, a radio frequency identifier (RFID), or a two-dimensional barcode.

15. The system of claim 10, wherein the second address is determined from address information associated with the third-party entity that is received from the user participation application executed on the client device, and the user participation application is in data communication with the user identification system over a network.

16. The system of claim 10, wherein the unique identifier code is depicted by a personalized symbol selected by the specific user.

17. The system of claim 10, wherein the plurality of computer instructions further causes the at least one computing device to at least:

determine a plurality of properties associated with the item; and send the plurality of properties associated with the item to the packaging system, the packaging system selecting a specific type of packaging unit to send to the third-party entity based at least in part on the plurality of properties associated with the item.

18. The system of claim 10, wherein information that identifies the specific user is absent from the encoded address label on the pre-paid packaging unit.

19. The system of claim 10, wherein the specific user purchased the item through the electronic commerce system, and the item is embedded with the unique identifier code prior to an original delivery to the specific user.

20. The system of claim 10, wherein the third-party entity sends the item to the specific user via the pre-paid packaging unit with the encoded address label.

* * * * *